March 18, 1952     C. E. MITTELL     2,589,842
TRANSPORTATION ASSEMBLY
Filed April 24, 1950     3 Sheets-Sheet 1
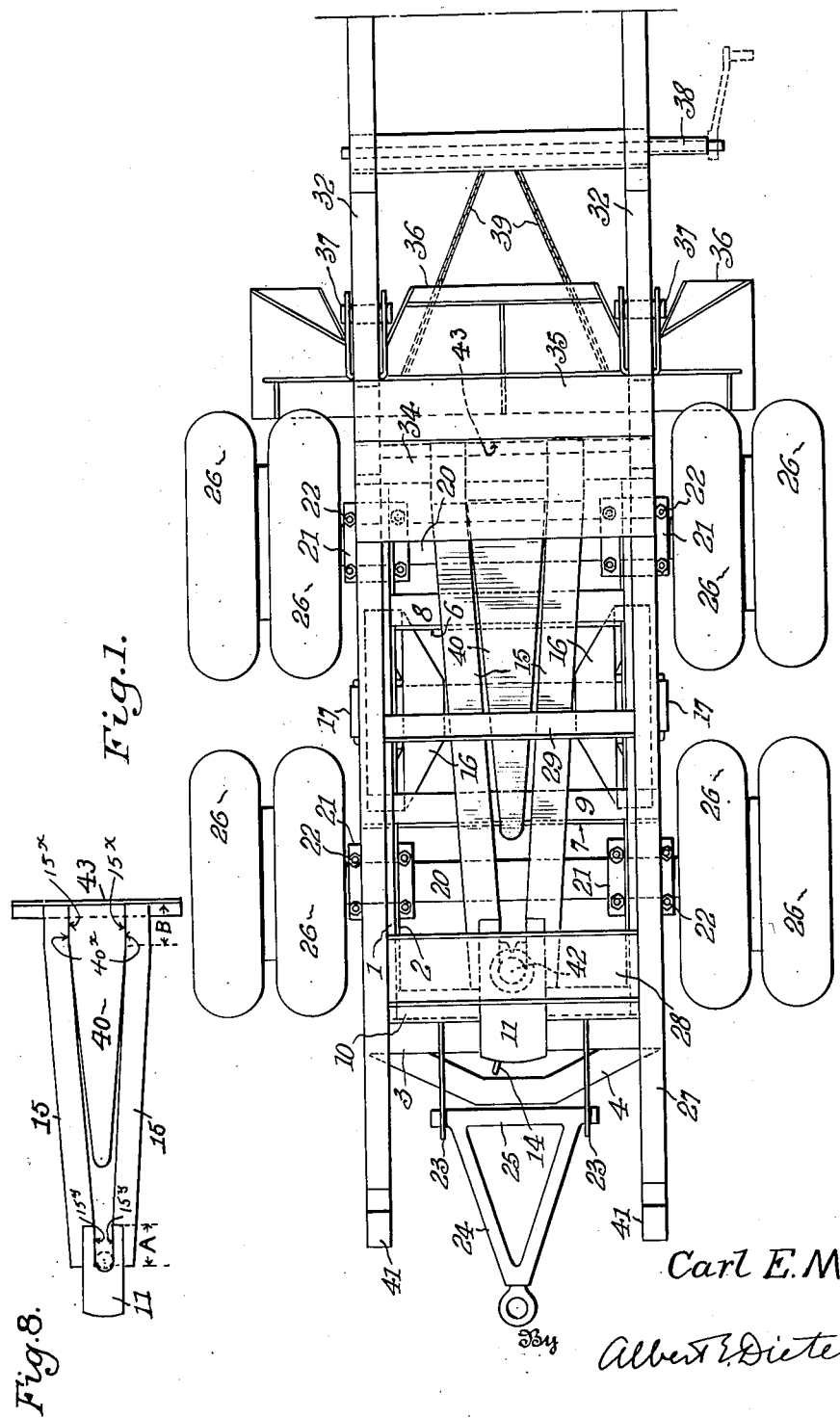
Inventor
Carl E. Mittell,
By Albert E. Dieterich,
ATTORNEY.

March 18, 1952  C. E. MITTELL  2,589,842
TRANSPORTATION ASSEMBLY
Filed April 24, 1950  3 Sheets-Sheet 2
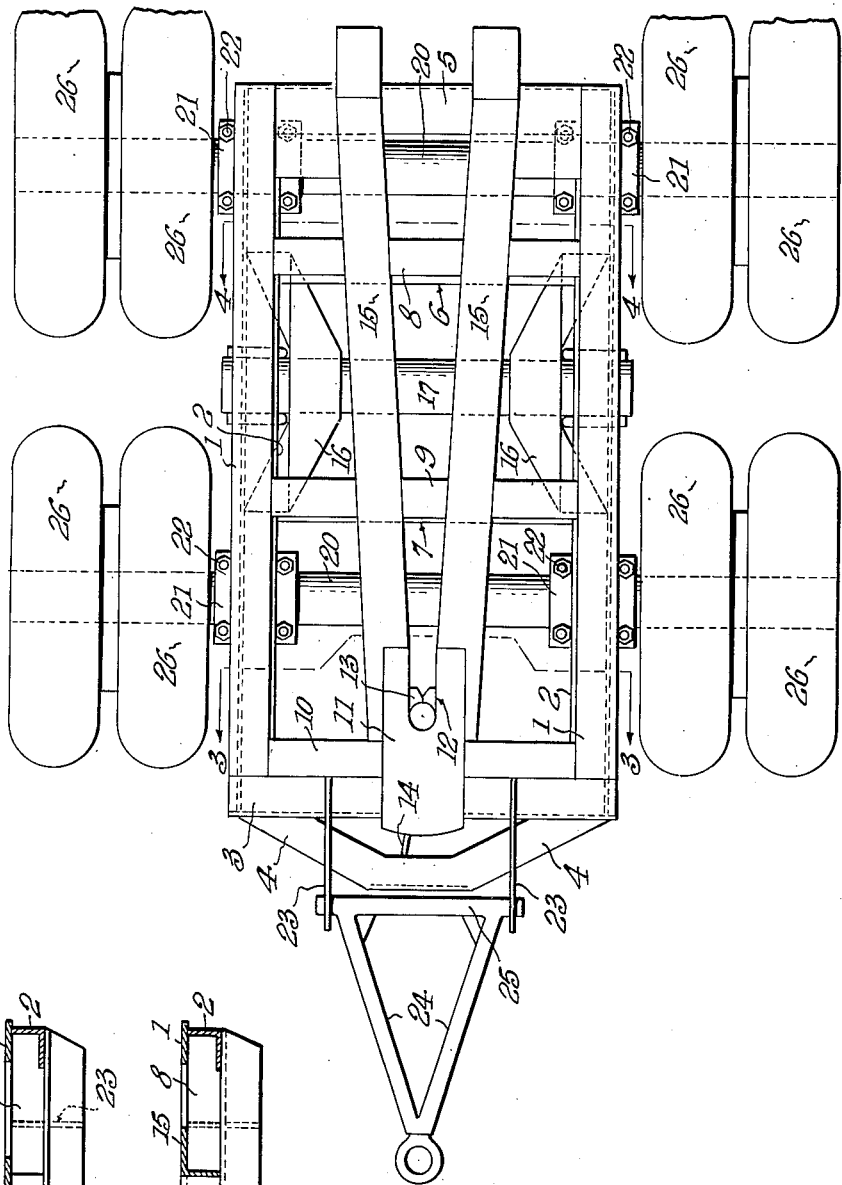
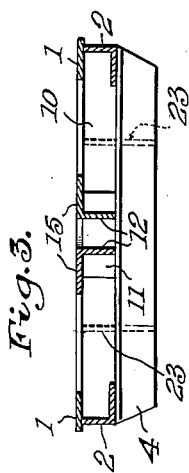
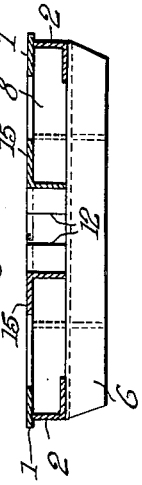
Inventor,
Carl E. Mittell,
By Albert E. Dieterich,
ATTORNEY.

March 18, 1952     C. E. MITTELL     2,589,842
TRANSPORTATION ASSEMBLY
Filed April 24, 1950     3 Sheets-Sheet 3
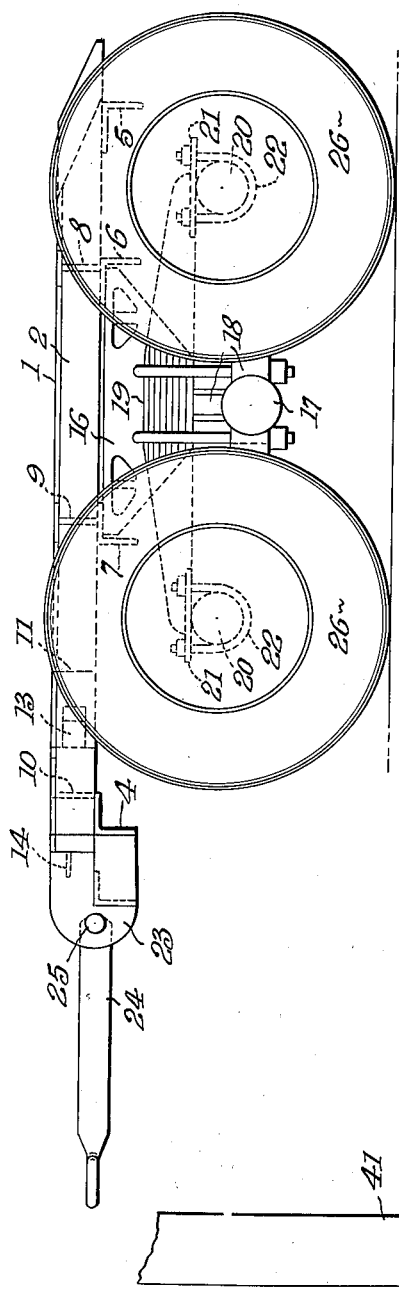
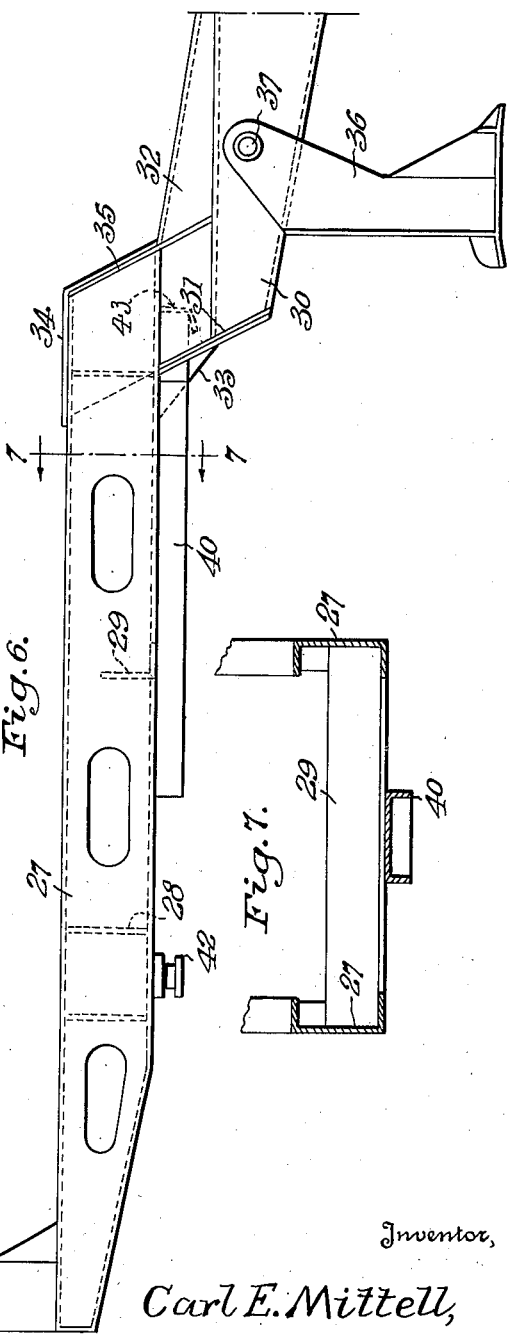
Inventor,
Carl E. Mittell,
By Albert E. Dieterich,
ATTORNEY.

Patented Mar. 18, 1952

2,589,842

UNITED STATES PATENT OFFICE 2,589,842

TRANSPORTATION ASSEMBLY

Carl E. Mittell, Sumter, S. C., assignor, by direct and mesne assignments, of one-half to John Evans Manufacturing Company, Inc., a corporation of South Carolina, and one-half to Tom N. Busch, Mobile, Ala.

Application April 24, 1950, Serial No. 157,766

3 Claims. (Cl. 280—29)

My invention relates to and is an improvement on the transportation assembly disclosed in Pat. No. 2,466,938, issued April 12, 1949. The present invention has for its objects:

1. To so improve the assembly of the aforesaid patent as to permit the use of a tandem axle arrangement instead of a single axle. The tandem axle is well known to the trade and its advantages are self-apparent. To stay within the legal load limit per axle and at the same time haul the tonnage many operators are now wanting, a tandem arrangement becomes a necessity.

2. To provide a new aligning device between the mobile axle unit and the crib that will simplify the problem of guiding the tandem mobile axle unit into proper alignment with the crib and securely lock the said unit and crib together.

3. To provide such an aligning device as will gradually urge the mobile or wheeled axle unit into proper alignment with the crib and avoid the need of special skill on the part of the operator in installing the mobile unit under the frame or crib.

4. To provide means to prevent any unnecessary tendency to binding as the two units are urged together.

To the attainment of the aforesaid objects and ends invention still further resides in the novel details of construction, combination and arrangement of parts, all of which will be first fully described in the following detailed description, and then be particularly pointed out in the appended claims, reference being had to the accompanying drawings, in which:

Fig. 1 is a top plan view of the rear end of the frame, crib bed or rack unit, and the mobile axle or wheeled axle unit, coupled together.

Fig. 2 is a top plan view of the wheeled axle unit per se.

Figs. 3 and 4 are, respectively, cross sections on the lines 3—3 and 4—4 of Fig. 2.

Fig. 5 is a side elevation of the wheeled axle unit per se.

Fig. 6 is a side elevation of the rear end portion of the frame, crib or rack unit, per se.

Fig. 7 is a cross section on the line 7—7 of Fig. 6.

Fig. 8 is a detail view hereinafter referred to specifically.

In the drawings, in which like numerals of reference indicate like parts in all the figures, 2 represents the longitudinal side angle irons or bars of the wheeled axle unit, 1 the side top plates, 3 the cross angle bar at one end, 4 a bent transverse angle bar located beneath the cross bar 3, while 5 indicates a transverse angle iron beneath the angle irons 2 at the other end of the machine, and 6 and 7 indicate the intermediate cross angle irons between which brackets 16 are located. The brackets are welded or otherwise suitably secured to the side bars 2. The side bars or beams 2 are connected also by T-bars 8 and 9 and an angle bar 10.

The parts 1 to 10 inclusive constitute the frame of the mobile or wheeled axle unit.

Welded, or otherwise suitably secured to the frame, is the female part 11 of the coupling mechanism. The construction of this mechanism may be like that shown in Figs. 12 to 14 inclusive of Pat. No. 2,466,938 aforesaid and include the holding jaws 13, the king pin entrance-way 12, and the release lever 14.

15 designates a pair of angle bars which diverge from the entrance-way 12 toward the opposite end of the mobile unit for a purpose later to appear.

It should be stated that, as shown, the top faces of the parts 1, 3, 8, 9, 10, 11, and 15 lie in substantially the same plane, thereby presenting a smooth top to the frame.

At the front of the frame, draft brackets 23 are mounted and support the shaft 25 of a draft bar 24.

The brackets 16 carry a rock shaft 17 which carries, at each side of the frame, spring saddles 18 on which leaf spring packs 19 are secured in any suitable way. The spring packs have mounting plates 21 secured at 22 to axles 20 on which wheels 26 are mounted, there being at least one pair of wheels 26 on each axle 20 (two pairs being shown in the drawings).

The construction of the crib or rack may be substantially the same as that disclosed in Pat. No. 2,466,938 aforesaid except that only one coupling pin is used at the rear end of the crib frame. In the present drawings the crib or rack (see Figs. 1, 6, and 7) is composed in part of longitudinal side beams 27, 30, of angle or channel irons and connected together longitudinally in a step by plates 31, 35 and braces 32, 33, and is connected transversely by a cross beam and angles 28, 29 respectively, and a cross plate 34. End standards 41 are located at one end of each side beam 27.

36 designates a stiff leg which is pivoted at 37 and which may be raised out of the way by means of a crank shaft 38 and chains 39.

Mounted under the beam 28 in the middle vertical plane of the frame (constituted in part by the elements 27 to 35 inclusive) is a coupling pin 42.

Securely mounted under the frame of the crib or rack is a channel iron 40 of wedge-shape in plan view having parallel side portions 40$^x$ which fit parallel side portions 15$^x$ of the members 15. The bars 15 also have parallel side portions 15$^y$ to receive the king pin 42. The bars 15 constitute a female wedge member.

The length of the portions 40$^x$, 15$^x$ and 15$^y$ is the same; or, in other words, the distance A equals that, B, indicated in Fig. 8.

The cross section measurement of the element 40 is somewhat smaller than the space between the bars 15 except at the straight or parallel section located at the larger end. The object of this is to prevent any unnecessary tendency to binding, as the two units are urged together. The structure just described insures perfect alignment before the coupling pin 42 is engaged by the locking mechanism of 11. A transverse angle 43 is welded to the larger end of the channel iron 40 and to the sides of the frame (see Figs. 1, 6 and 8). This angle is so placed that it engages the ends of the bars 15 to prevent vertical movement between the frame and the mobile axle unit.

It should be understood, of course, that the portion of the crib or rack omitted from Fig. 1 is of substantially the same construction as that shown in Fig. 2 of Pat. No. 2,466,938 aforesaid so as to cooperate with the usual towing vehicle.

The manner of using the present invention is substantially the same as that of the embodiment disclosed in the patent aforesaid, as will be obvious to those skilled in the art.

What I claim is:

1. In transportation assemblies including a crib unit and a mobile unit detachably coupled to the crib at its rear end, the improvement which comprises a single female coupling element on the mobile unit and a single male coupling element on the rear end of the crib, and means to restrain the mobile unit from swiveling on said last named male coupling element, said means comprising a female wedge on one of the two coupled units and a male wedge on the other of said units for engaging each other when the male and female coupling elements are operatively connected.

2. In transportation assemblies including a crib unit and a mobile unit detachably coupled to the crib at its rear end, the improvement which comprises a single female coupling element on the mobile unit and a single male coupling element on the rear end of the crib, and means to restrain the mobile unit from swiveling on said last named male coupling element, said means comprising a pair of elongated bars on said mobile unit which bars diverge from said female coupling unit, and a wedge-shaped member located on and beneath said crib unit for cooperating with said bars to maintain said units in longitudinal alignment when said units are coupled together.

3. In transportation assemblies including a crib unit and a mobile unit detachably coupled to the crib at its rear end, the improvement which comprises a single female coupling element on the mobile unit and a single male coupling element on the rear end of the crib, means to restrain the mobile unit from swiveling on said last named male coupling element, said means comprising a pair of elongated bars on said mobile unit which bars diverge from said female coupling unit, a wedge-shaped member located on and beneath said crib unit for cooperating with said bars to maintain said units in longitudinal alignment when said units are coupled together, and means to prevent vertical movement between the mobile unit and the crib.

CARL E. MITTELL.

REFERENCES CITED

The following references are of record in the file of this patent:

UNITED STATES PATENTS

| Number | Name | Date |
|---|---|---|
| 2,466,938 | Evans et al. | Apr. 12, 1949 |